W. E. BROBST, Jr.
EQUALIZER FOR VEHICLE SUSPENSION.
APPLICATION FILED AUG. 29, 1921.
1,423,180.  Patented July 18, 1922.
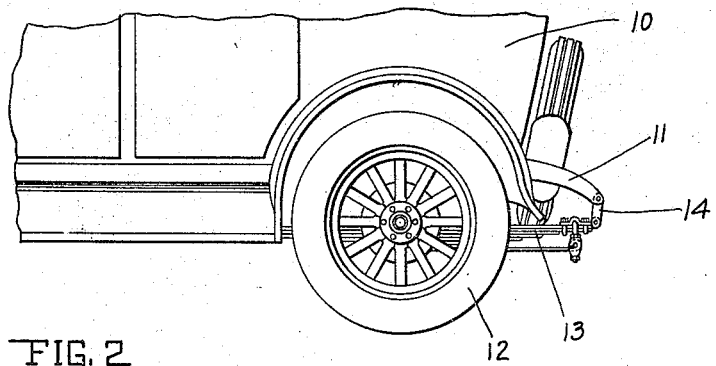
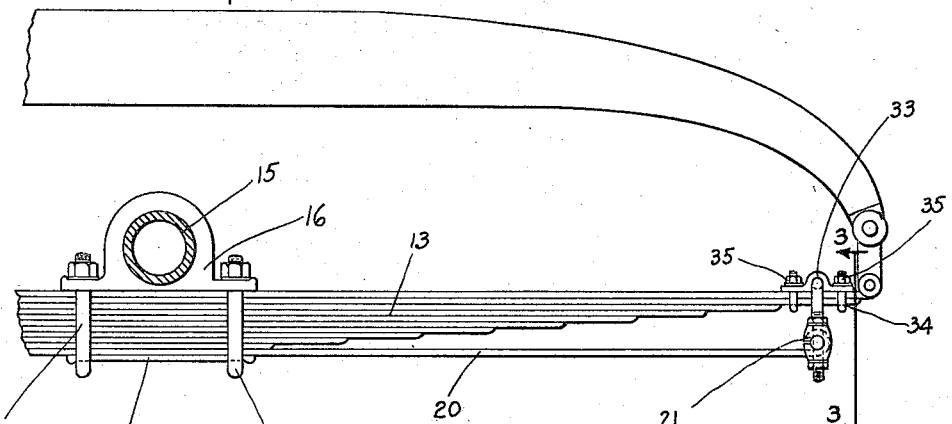
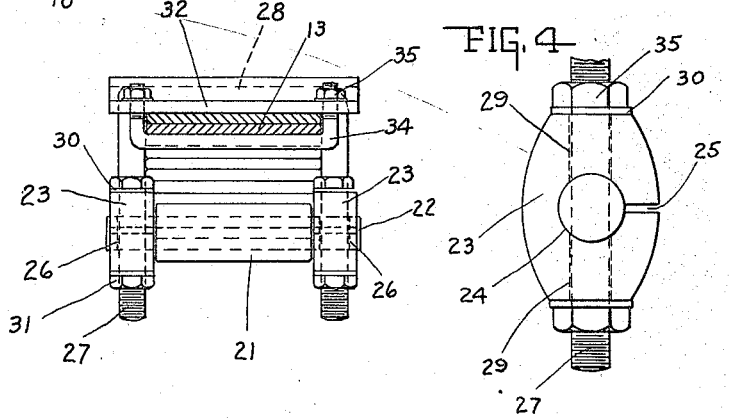
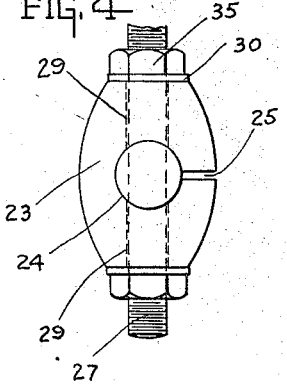
INVENTOR.
WILLIAM E. BROBST, JR.
BY
ATTORNEYS.

UNITED STATES PATENT OFFICE.

WILLIAM E. BROBST, JR., OF NOBLESVILLE, INDIANA.

EQUALIZER FOR VEHICLE SUSPENSION.

1,423,180.   Specification of Letters Patent.   Patented July 18, 1922.

Application filed August 29, 1921. Serial No. 496,445.

*To all whom it may concern:*

Be it known that I, WILLIAM E. BROBST, Jr., a citizen of the United States, and a resident of Noblesville, county of Hamilton, and State of Indiana, have invented a certain new and useful Equalizer for Vehicle Suspension; and I do hereby declare that the following is a full, clear, and exact description thereof, reference being had to the accompanying drawings, in which like numerals refer to like parts.

This invention relates to an equalizer construction for vehicle suspension.

The chief object of the invention is to improve equalizer constructions for vehicle suspensions by mounting the equalizing spring in an improved manner upon the vehicle spring.

The chief features of the invention consists in the particular mounting of the equalizer spring upon the vehicle spring of a vehicle suspension.

The full nature of the invention will be understood from the accompanying drawings and the following description and claims.

In the drawings, Fig. 1 is a side elevational view of a part of a motor vehicle showing the same equipped with the invention. Fig. 2 is an enlarged side elevational view of the frame, axle, vehicle spring and equalizer spring shown in Fig. 1. Fig. 3 is a sectional view taken on line 3—3 of Fig. 2 and in the direction of the arrows. Fig. 4 is an elevational view of the spring-eye pin bearing and its adjustable mounting.

In the drawings 10 indicates a motor vehicle including the frame 11, supporting wheel 12, main spring 13 and shackle 14, by which the main spring is secured to the frame. The wheel 12 is supported upon an axle 15, see Fig. 2, which in turn supports the main spring 13 by means of the bracket 16, the plate 17 and U-bolts 18, all of which is of the ordinary or usual construction.

The equalizer spring 20 is herein shown as being secured to the spring 13 beneath said spring by the same means which secures the spring 13 to the axle 15. However, the spring 20 may be otherwise positioned or secured. The equalizer spring 20 terminates adjacent the end of the spring 13 in a spring-eye 21, and a pin 22 extends through said eye and permits said spring 20 to swivel thereon.

The pin 22 at each end is extended beyond the spring-eye 21 and is seatable in a split bearing member or clamping socket 23 which has a bearing opening 24 therein and the split 25. Herein the pin 22 is shown provided with the openings 26, and extending through said openings in the bearing portion of said pin 22 is one end 27 of a U-bolt 28. The ends 27 extend through openings 29 in the clamping bearing members 23, and suitable washers 30, together with the locking nuts 31, are adapted to adjust the position of the end of the spring 20 towards and away from the end of the spring 13. By this means the equalizer spring 20 may be maintained in such condition that there will be no strain upon the same under normal load, but the equalizer spring will exert force in opposition to the usual movement of the spring 13, thereby cushioning or equalizing the action of the several vehicle members in over- or underloading and upon shock and rebound.

The means for mounting the U-shaped bolt 28 upon the spring 13 adjacent the end thereof comprises a plate 32 having a channel or groove 33 therein which is adapted to receive the central portion 28 of the U-shaped bolt. The plate 32 is suitably secured to the spring 13 by the U-shaped bolts 34 and the nuts 35. It will be understood from the foregoing that the U-shaped bolt is swiveled in the groove 33, and since the eye of the spring 21 is swiveled on the pin 22, relative movement between the springs is permitted, as required.

The invention claimed is:

1. In an equalizer spring construction for a vehicle suspension, the combination with a main spring, and an equalizer spring, of a spring-eye pin for supporting the end of said equalizer spring, a split socket for said pin, means for securing said pin in said socket, and means for supporting said socket on said main spring.

2. In an equalizer spring construction for a vehicle suspension, the combination with a main spring, and an equalizer spring, of a spring-eye pin for supporting the end of said equalizer spring, of a socket for said pin, means for supporting said socket on said main spring, and means for adjusting said socket on said supporting means.

3. In an equalizer spring construction for a vehicle suspension, the combination with a main spring, and an equalizer spring, of a pair of sockets for supporting the ends of said pin, a bolt portion for each socket, said bolt portions being swivelably supported upon said main spring, and means for securing said sockets on said bolts and preventing longitudinal movement thereon.

4. In an equalizer spring construction for a vehicle suspension, the combination with a main spring, and an equalizer spring, of a bracket plate having a groove therein, means for securing said bracket to said main spring, a U-bolt positioned in said groove of said bracket, a pair of sockets slidably supported upon the ends of the U-bolt, nuts at each end of each socket for adjustably securing said socket upon said bolt, whereby said equalizer spring may be secured in adjusted position.

In testimony whereof, I have hereunto affixed my signature.

WILLIAM E. BROBST, Jr.